United States Patent [19]

Wupper

[11] Patent Number: 4,634,190
[45] Date of Patent: Jan. 6, 1987

[54] HYDRAULIC BRAKE SYSTEM WITH SLIP CONTROL

[75] Inventor: Hans Wupper, Friedrichsdorf, Fed. Rep. of Germany

[73] Assignee: ITT Industries, Inc., New York, N.Y.

[21] Appl. No.: 828,571

[22] Filed: Feb. 10, 1986

Related U.S. Application Data

[63] Continuation of Ser. No. 544,635, Oct. 24, 1985, abandoned.

[30] Foreign Application Priority Data

Nov. 2, 1982 [DE] Fed. Rep. of Germany ....... 3240404

[51] Int. Cl.$^4$ .......................... B60T 8/32; B60T 13/12
[52] U.S. Cl. .................................... 303/114; 303/115; 303/119
[58] Field of Search ............... 303/115, 116, 114, 117, 303/118, 119, 10, 52; 188/345

[56] References Cited

U.S. PATENT DOCUMENTS

| | | | |
|---|---|---|---|
| 3,731,980 | 5/1973 | Fink et al. | 303/119 |
| 4,035,034 | 7/1977 | Sekiguchi | 303/115 |
| 4,415,210 | 11/1983 | Belart et al. | 303/92 |

FOREIGN PATENT DOCUMENTS

| | | |
|---|---|---|
| 1961039 | 6/1971 | Fed. Rep. of Germany . |
| 2112091 | 9/1971 | Fed. Rep. of Germany . |
| 2126391 | 11/1974 | Fed. Rep. of Germany . |
| 2450749 | 4/1976 | Fed. Rep. of Germany . |
| 3040561 | 5/1982 | Fed. Rep. of Germany . |

Primary Examiner—Douglas C. Butler
Assistant Examiner—Alvin Oberley
Attorney, Agent, or Firm—James B. Raden; Donald J. Breh

[57] ABSTRACT

A hydraulic brake system with slip control for motor vehicles is provided. The system includes a master cylinder with a hydraulic brake booster arranged in front of the master cylinder. There is at least one static brake circuit connected to the master cylinder and a dynamic brake circuit connected to the pressure chamber of the hydraulic booster. Valves are connected in the brake circuits for the control of the wheel cylinder pressures during slip control. A gasket at the master cylinder piston acts as check valve via which pressure medium may be supplied from the dynamic brake circuit into the static brake circuit by pressurization of the pedal-close front face of the master cylinder piston. The pedal-close front face of the master cylinder piston may be alternatively connected to the dynamic brake circuit or to an unpressurized return reservoir by an electromagnetic switch-over valve. A pressure dependent throttle valve provides passage between the booster pressure chamber and the dynamic brake circuit or a throttle between the booster pressure chamber and the dynamic brake circuit. In this way, there will be a reduction of the pressure gradient of the stage of pressure build-up during control, without the pressure gradient in the initial stage of braking being influenced. In this way, there will be a reduction of the pressure gradient of the stage of pressure build-up during control, without the pressure gradient in the initial stage of braking being influenced.

2 Claims, 6 Drawing Figures

HYDRAULIC BRAKE SYSTEM WITH SLIP CONTROL

This application is a continuation, of application Ser. No. 544,635, filed Oct. 24, 1985, now abandoned.

BACKGROUND OF THE INVENTION

This invention relates to a hydraulic brake system with slip control. The system is designed for use in motor vehicles equipped with a master cylinder, a hydraulic brake booster connected in front of the master cylinder, at least one static brake circuit connected to the master cylinder and a dynamic brake circuit connected to the pressure chamber of the hydraulic booster. Valves are connected in the brake circuits for the control of the wheel cylinder pressures during slip control. A gasket at the master cylinder piston acts as check valve via which, if required, pressure medium may be supplied from the dynamic brake circuit into the static brake circuit by pressurization of the pedal-close front face of the master cylinder piston. The pedal-close front face of the master cylinder piston is capable of being alternatively connected to the dynamic brake circuit or to an unpressurized return reservoir by means of an electromagnetic switch-over valve.

Such a brake system is described in U.S. Pat. No. 4,415,210. This hydraulic brake system comprises a hydraulic brake booster, with a dynamic brake circuit being connected to the pressured chamber thereof supplying the wheel brakes of the rear axle of a motor vehicle jointly with pressure via an electromagnetically operable 2/2-way valve which normally is open. By means of the booster piston of the hydraulic brake booster, it is possible to actuate a master cylinder coaxially of the hydraulic brake booster and having two master cylinder pistons arranged one behind the other. In this way, two working chambers are formed in the master cylinder which may be pressurized, each of them supplying pressure to a static brake circuit. By means of each static brake circuit it is possible to actuate a wheel brake preferably the front axle of a vehicle.

Associated with each of the master cylinder pistons is a prechamber from which an expansion bore leads into the working chamber, through which communication is established to the pedal-close front face of the master cylinder piston. Both master cylinder pistons are sealed by a gasket acting as a check valve. An electromagnetically operable 2/2-way valve which normally is open is also arranged between each working chamber of the master cylinder and the wheel brake associated with said working chamber.

Both during the brake release and during braking actions below the lock-up limit, an unpressurized return reservoir and the prechambers hydraulically communicate via an electromagnetically operable switch-over valve. As soon as a set lock-up threshold has been reached, the switch-over valve will switch, causing the prechambers and the pedal-close front faces of the master cylinder pistons to become pressurized by the pressure of the dynamic brake circuit. Thus, via the master cylinder gaskets in the working chambers of the master cylinder, it will be possible to replace pressure medium tapped from the static brake circuits for the purpose of a pressure reduction in the front wheel brakes.

Such hydraulic brake systems usually have throttles provided in the electromagnetically operable 2/2-way valves which are normally open. These throttles effect a more steady control behavior and reduce the number of switching actuations of the solenoid valves during a controlled braking action. In this connection it is somewhat disadvantageous that the throttles contained in the solenoid valves are also effective in the initial stage of braking; thus the pressure gradient received by the wheel brakes will be relatively low until a set lock-up threshold. This may have disadvantageous consequences, in particular in such operating conditions in which the driver of the vehicle is forced to generate a relatively high braking pressure in the wheel brakes as quickly as possible.

SUMMARY OF THE INVENTION

It is thus an object of the present invention to produce a hydraulic brake system with the characteristics referred to above by simple structural measures so that the throttles will not influence the increase of the wheel cylinder pressure in the initial stage of braking up to reaching a lock-up threshold and that, during brake slip control, the course of the pressure increase will be relatively flat.

To resolve this problem in the present invention, a first throttle may be connected in the dynamic brake circuit which will throttle the pressure medium supply to the dynamic brake circuit upon pressurization of the pedal-close front face of the master cylinder piston. In such an embodiment, advantageously, electromagnetically operable directional valves having no throttling effect at all may be inserted in the brake circuits. Thus, in the initial stage of braking, the braking pressure will strongly increase per unit of time until critical slip values will have been reached at one or at several of the vehicle wheels, the rate of increase, of course, also being limited by the flow cross-sections of the available pressure medium lines. Only when the monitoring electronics detect a lock-up tendency at one or at several of the vehicle wheels will a throttle be connected in the dynamic brake circuit. At the same time the electromagnetic switch-over valve will operate. Thus the prechambers of the master cylinder will communicate with the dynamic brake circuit, the communication being established downstream of the throttle. If after the removal of pressure medium from one or from several of the brake circuits a further increase of the braking pressure becomes necessary, due to the now effective throttle, the pressure increase will have an essentially lower pressure gradient than in the initial stage of braking. The rating of the throttling cross-section allows advantageous adjustment to the desired value of the gradient of the pressure increase during control.

It is preferable that the throttle be a component of a pressure-dependent operable 2/2-way valve which upon pressurization of the pedal-close front face of the master cylinder piston switches from free passage into a throttling position. Such pressure-dependent, operable directional valves are relatively inexpensive components. Moreover, they are hardly susceptible to trouble and thus reliable in operation. Alternatively, it is possible to use a 2/2-way valve which is electromagnetically operable and which receives the same switch signals as the electromagnetic switch-over valve. If the directional valve is electromagnetically operable, one pressure medium line or rather one pressure medium channel may be dispensed with in the housing of the of the booster-master-cylinder unit. An electromagnetically operable 2/2-way valve will be selected in particular in case the valve is to be arranged remotely in respect of the booster-master-cylinder unit e.g. for reasons of constructional space. In order to simultaneously supply the same switch signals to the switch-over valve and to the directional valve containing the throttle, a simple parallel connection of the exciting coils is a possible solution.

An advantageous further embodiment of the present invention is achieved in that a second throttle may be connected in the connection between the pressure chamber of the hydraulic brake booster and the electromagnetic switch-over valve. Using such a measure, by means of the dimensioning of the orifices of the first and second throttles, it will advantageously be possible to adjust the pressure gradients at the rear and front axles differently during the stage of pressure build-up within a control cycle.

Under certain marginal conditions, in the most simple form, it is conceivable that the first and second throttles will become effective simultaneously. On the other hand, it may be quite advantageous for the second throttle to become effective with a time lag in respect of the first throttle, thus the braking pressures in the static brake circuits at first rapidly increasing and subsequently reapproaching the lock-up pressure with a low gradient. Such a lagged operation of the throttles may also lead to further advantages if the throttles differ in their cross-sections.

An advantageous further embodiment will result if a third throttle is arranged in the connection between the electromagnetic switch-over valve and an annular chamber confined by the pedal-close front face of the master cylinder In this case it is conceivable that the third throttle will take over the function of the second throttle or that it will additionally become effective. Moreover, it will be advantageous if each annular chamber of the master cylinder is associated with a prechamber which may alternatively be connected to the dynamic brake circuit or to an unpressurized return reservoir by means of the electromagnetic switch-over valve and if a throttle valve is arranged in each connection between a prechamber and an annular chamber. Thanks to these measures there will result the advantage that the throttle valve or rather a rigidly set throttle will completely be integrated into the housing of the master cylinder by the most simple constructional measures. In the most simple case, the connections between the prechamber and the annular chamber are rated so small as to thus achieve the desired throttling effect. An extremely compact design of the brake system will be achieved by integrating the electromagnetic switch-over valve and the 2/2-way valve into the housing of the master cylinder and/or of the hydraulic brake booster.

It will be a further advantage for the master cylinder to be a tandem master cylinder, for the throttle to be a component of a hydraulically controllable 6/2-way valve connected in the connections between the working chambers of the master cylinder, the pressure chamber of the hydraulic brake booster, and the wheel brakes to be actuated. The 6/2-way valve preferably has a spring-loaded piston with circumferential grooves of different cross-sections. Upon pressurization of the piston, circumferential grooves of smaller cross-section become effective between two housing ports, the two ports of the housing each time corresponding to each other. The outlets of the 6/2-way valve permit advantageous connection with the wheel brake via 3/2-way valves, thus altogether resulting in a saving in the number of electromagnetically operable valves. The 3/2-way valves may have throttled passages in the pressure medium reduction position, thus also the pressure gradient in the wheel brakes becoming influenceable during the stage of pressure reduction.

An advantageous further embodiment of the subject matter of the application provides for the connection of a throttle valve between the prechamber and the annular chamber confined by the pedal-close front face of the master cylinder piston. Upon pressurization of the prechamber, the closure member of said throttle valve switches with a time lag into a throttling position. Thus immediately after pressurization of the prechamber of rather after the switching-over of the inlet valve associated with the wheel brake there will at first be a throttling of the volume flowing out of the prechamber, thus resulting in a relatively steep pressure gradient in the wheel brake. After a certain time lag, the pressure increase in the wheel brakes will take place with a correspondingly lower gradient.

In this connection, an expedient embodiment of the present invention allows the throttle valve to act as a double seat valve whose closure member forms a slightly throttled passage in the rest position when it rests at a prechamber-side valve seat, forming a more strongly throttled passage in the working position when it abuts at an annular-chamber-side valve seat. Preferably, the closure member of the double seat valve is resiliently prestressed against the prechamberside valve seat. The resilient prestress is rated such that a pressure difference will already develop at the closure member of the double seat valve when pressure medium is flowing along the prechamber-side valve seat. The pressure difference will increase and finally overcome the force of the resilient prestress, urging the valve closure member into a position in which there will come about a strong throttling of the volume flow. Such a throttle valve arrangement may easily be connected before the dynamic circuit, also. However, it is alternatively likewise conceivable to connect a further throttle valve in the connection between the pressure chamber of the hydraulic brake booster and the dynamic wheel brakes, the throttle valve having a working piston which is pressurizable by the pressure in the pressure chamber and which will establish an unthrottled communication to the pressure chamber of the hydraulic brake booster; in the other position, when pressurized, it will effect a corresponding throttling piston.

BRIEF DESCRIPTION OF THE DRAWINGS

Examples of embodiments of the invention will be explained in more detail in the following, reference being made to FIGS. 1 through 6 of the drawing, wherein.

DETAILED DESCRIPTION

Figure 1:
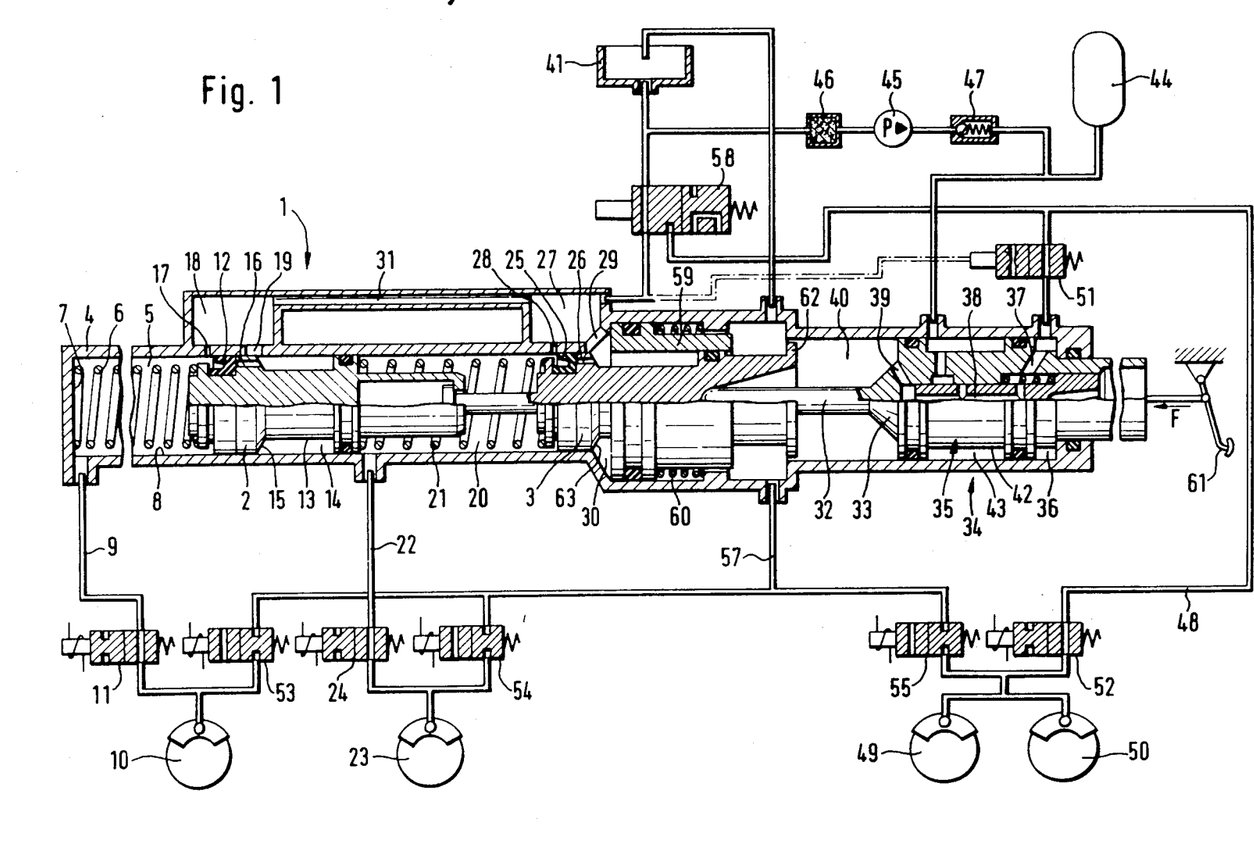
FIG. 1 is a schematic drawing of a brake system shown in principle.

In FIG. 1, is shown a master cylinder 1 with two master cylinder pistons 2, 3 lying one behind each other in the cylinder. The arrangement is such that, together with the housing 4, the master cylinder piston 2 forms a first working chamber 5 accommodating a compression spring 6 which provides a return of the piston and supports itself both at the bottom 7 of the master cylinder bore 8, and at the master cylinder piston 2. Connected at the first working chamber 5 is a first brake circuit 9 establishing a connection between the first working chamber 5 and a wheel brake 10 preferably arranged at the front axle of a vehicle. Connected in the first brake circuit is a 2/2-way valve 11 which normally is open and which may be switched electromagnetically into the locking position.

The master cylinder piston 2 has a gasket 12 which has a check-valve function and which may be opened in the direction of the first working chamber 5. Further, the master cylinder piston 2 has a radial circumferential groove 13, which combines with the housing 4 to form an annular chamber 14. Passages 16 lead from the pedal-remote axial confining surface 15 of the radial circumferential groove 13 to the backside of the gasket 12.

In the brake-released position represented in FIG. 1, there is an expansion bore 17 in front of the gasket in the direction of actuation. The expansion bore 17 establishes communication between the working chamber 5 of the master cylinder 1 and a first prechamber 18. Further, a feed bore 19 establishes communication between the first prechamber 18 and the annular chamber 14.

Between the pedal-remote master cylinder piston 2 and the pedal-close master cylinder piston 3 a second working chamber 20 is formed in which a compression spring 21 is arranged which supports itself between the two master cylinder pistons 2, 3. A second static brake circuit 22 leading to a further wheel brake 23 branches off from the second working chamber 20. In said second brake circuit 22, a directional valve 24 is connected which corresponds to valve 11.

The pedal-close master cylinder piston 3, also, has a gasket 25 and is provided with passages 26 corresponding to the passages 16 of the master cylinder piston 2. The master cylinder piston 3 has an associated prechamber 27 from which an expansion bore 28 leads into the working chamber 20 and from which a feed bore 29 leads into an annular chamber 30. The two prechambers 18 and 27 communicate with each other by means of a channel 31. The second master cylinder piston 3 cooperates with a tappet 32 which is a part of a booster piston 33 of a hydraulic brake booster 34. The booster piston 33 receives a brake valve 35 by means of which pressure may be modulated in a pressure chamber 36 of the hydraulic brake booster 34, which pressure is proportional to the respective pedal force applied. In the brake-released position of FIG. 1, the pressure chamber 36 is unpressurized as it communicates with a chamber 40 between the master cylinder piston 3 and the booster piston 33 via a path through channels 37, 38, 39. Chamber 40 is in constant communication with an unpressurized return reservoir 41.

The booster piston 33 is likewise provided with a radial circumferential groove 42 forming an annular chamber 43 which is supplied with the pressure from an accumulator. Pressure in the accumulator 44 is raised from a vacuum pressure medium pump 45 which draws pressure medium from the unpressurized return reservoir 41 via a filter 46 and as the pressure increases, supplies it to the accumulator 44 via a check valve 47.

At the pressure chamber 36 of the hydraulic brake booster 34, a third brake circuit 48 is connected by means of which wheel brakes 49, 50 at the rear axle of a vehicle are jointly supplied with pressure. Between the pressure chamber 36 of the hydraulic brake booster 34 and the wheel brakes 49, 50 there is a pressure-dependent valve 51 and an electromagnetically operable valve 52, the latter being identical with the electromagnetically operable valve 11. The wheel brakes 10, 23, 49 and 50 further communicate with a common return line 57 via electromagnetically operable and normally closed 2/2-way valves 53, 54, 55 and 56. The return line 57 terminates in the permanently unpressurized chamber 40 between the booster piston 33 and the pedal-close master cylinder piston 3.

The pressure-dependent valve 51 has two positions. In a first or released position in which the drive does not receive any pressure, a free passage is established from the pressure chamber 36 of the hydraulic brake booster 34 to the third brake circuit 48. The valve 51 will switch into the working position upon pressurization of the drive of the valve 51, the drive being connected at the prechamber 27. In the working position, a throttle will come into the connection between the pressure chamber 36 and the third brake circuit 48 and will substitute for free communication. Further, the third brake circuit 48 has communication with an electromagnetic switchover valve 58 which normally establishes communication between the unpressurized return reservoir 41 and the prechambers 18 and 27. When excited, valve 58 will interrupt the communication and supply the pressure of the dynamic brake circuit 48 to the prechambers 18 and 27 of the master cylinder 1. All the electromagnetically controlled valves 11, 53, 24, 54, 55 and 58 receive their operating signals from slip monitoring electronics (not shown) which monitor the rotational behavior of the vehicle wheels and emitting control signals when detecting critical slip values, in a known manner.

The pedal-close master cylinder piston 3 is partially guided in a sealed and axially displaceable manner in a return sleeve 59, with the pedal-remote front face of the return sleeve 59 projecting into the annular chamber 30 and its pedal-close front face being exposed to the pressure of chamber 40. In the brake-release position, a compression spring 60 keeps the return sleeve 59 in a pedal-remote end position of FIG. 1.

Figure 2:
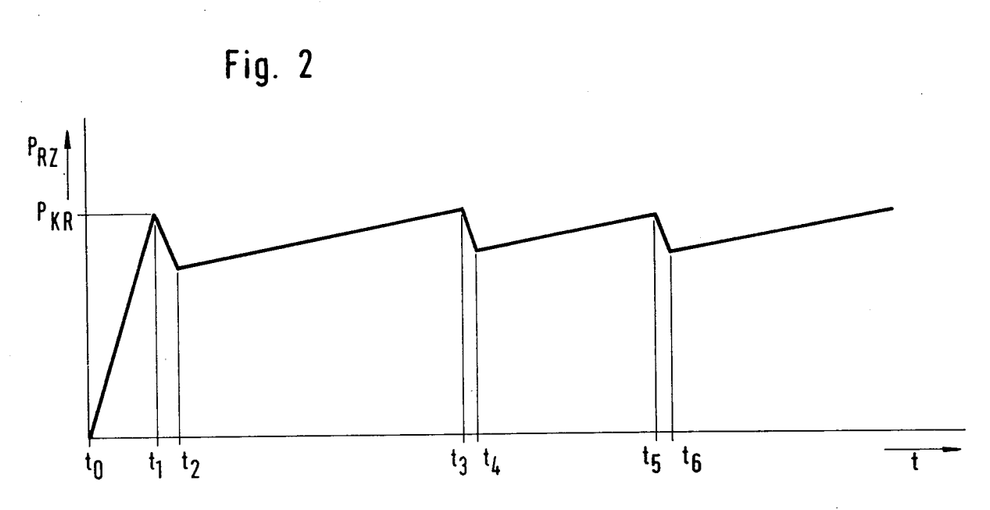
FIG. 2 is a graph of the possible pressure course of a wheel cylinder pressure with a brake slip control operation.

FIG. 2 illustrates a course of a wheel cylinder pressure $P_{RZ}$, for example in wheel brake 10, plotted against the time t, in following the mode of operation of the described brake system, starting from the brake-released position illustrated in FIG. 1 in which all the movable parts are in the indicated positions and in which no actuating force F is exerted on the brake pedal 61. When, due to application of an actuating force F to the brake pedal 61 at the time $t_0$ (FIG. 2), a braking action is initiated. The brake valve 35 will modulate a pressure in the pressure chamber 36 of the hydraulic brake booster 34, the pressure being proportional to said actuating force F. Via the pressure-dependent valve 51 which at first forms a free passage, pressure will enter the dynamic brake circuit 48; and, via the electromagnetically operable valve 52, the pressure will thus become effective at the wheel brakes 49, 50 of the rear axle of the vehicle. When a certain pressure level will have been reached in the pressure chamber 36 of the hydraulic brake booster 34, the booster piston 33 will move to the left in the drawing and, via the tappet 32, will mechanically transmit displacement to the pedal-close master cylinder piston 3. A leftward displacement of the master cylinder piston 3 will cause the gasket 25 to override the expansion bore 28 leading to the prechamber 27. As a result, a static braking pressure will be generated in the second working chamber 20 of the master cylinder 1. This braking pressure will enter the second static brake circuit 22 and actuate a wheel brake 23 via the free passage of the electromagnetically operable valve 24. By means of the volume of pressure in the second working chamber, the master cylinder pistons 2 and 3 of the master cylinder are now hydraulically coupled to each other. The pedal-remote master cylinder piston 2 will move in the direction of actuation and override the expansion bore 17 by means of the gasket 12. Upon a further displacement in the direction of actuation, the master cylinder piston 2 will generate a further static braking pressure in the first working chamber 5. The braking pressure will reach the wheel brake 10 via the first brake circuit 9 and the electromagnetically operable valve 11.

As the actuating force F applied to the brake pedal 61 increases, this mode of operation will continue until, at time $t_1$ (FIG. 2), a critical wheel cylinder pressure $P_{KR}$ will be reached when an unduly high slip value will have been reached at one or more vehicle wheels and a lock-up of the respective wheel(s) will be impending. At time $t_1$, slip monitoring electronics (not shown) will emit operating signals to the valves 11, 53. The valves will change their operative states so as to interrupt the communication between the first working chamber 5 of the master cylinder 1 and the wheel brake 10 and to establish a communication between the wheel brake 10 and the common return line 57 via the valve 53 now forming a free passage. In this position of the valves 11, 53, the pressure medium will be tapped from the wheel brake 10 and returned to the return reservoir 4 causing the wheel cylinder pressure $P_{RZ}$ in the wheel brake 10 to drop until time $t_2$. The rate of the pressure drop is determined by the flow cross-sections within the system. It may, however, be influenced by connecting additional throttles.

As soon as the slip monitoring electronics come into operation, the electromagnetic switch-over valve 58 will be actuated. Communication will be interrupted between the unpressurized return reservoir 41 and the prechamber 27, and the prechamber 27 will communicate with the outlet of the pressure-dependent operable valve 51 and the dynamic brake circuit 48, respectively.

At time $t_2$ it is assumed that the vehicle wheel associated with the wheel brake 10 will have reaccelerated, thus enabling a new increase of the wheel cylinder pressure $P_{RZ}$. The slip monitoring electronics thereupon will return the valves 11, 53 into their rest positions, thus enabling the wheel cylinder pressure $P_{RZ}$ in the wheel brake 10 to rise once again.

A pressurization of the prechamber 27 will propagate via the channel 31 to the prechamber 18, also, and will further become effective in the annular chamber 30. The return sleeve 59 will be pressurized in the direction of the brake pedal, and will move to abut a shoulder 62 of the pedal-close master cylinder piston 3, and thus ensure defined positions of the master cylinder pistons 2 and 3 in which a certain fluid volume is enclosed in the working chambers 5 and 20 as a safety reserve. Hydraulic pressure in the prechamber 27 will also act on the drive of the pressure-dependent valve 51 which will switch over into the working position in which there will be a throttling of the communication to the pressure chamber 36 of the hydraulic brake booster 34. The pressurization of the prechamber 18, 27 will be maintained until the slip monitoring electronics will have detected that the danger of a lock-up has been averted at all the vehicle wheels.

A reincrease of the wheel cylinder pressure $P_{RZ}$ in the wheel brake 10 at time $t_2$ will take place in the following manner. Pressure medium will flow from the dynamic circuit 48, via the electromagnetic valve 58, the prechambers 18, 27, the feed bore 19 into the annular chamber 14. From the annular chamber 14, it will flow via the passages 16 and the gasket 12 into the working chamber 5 of the master cylinder 1. The pressure medium flow will effect an increase of the pressure in the first brake circuit 9 and in the wheel brake 10, respectively, which is connected to the first brake circuit 9. The rate of this pressure increase will substantially be determined by the throttling cross-section of the pressure-dependent operable valve 51. The smaller the throttling cross-sections of the pressure-dependent operable valve 51 the lower the pressure gradient between times $t_2$ and $t_3$ will be.

At time $t_3$, the wheel cylinder pressure $P_{RZ}$ will have increased in the wheel brake 10 to a level that again a critical slip value will have been reached. Again, pressure medium must be tapped from the wheel brake 10 so as to prevent a lock-up of the vehicle wheel associated with the wheel brake 10.

At time $t_4$, a new stage of pressure build-up will be initiated which will last until time $t_5$, the pressure gradient of which will correspond to the pressure gradient between times $t_3$ and $t_2$. A further pressure build-up will take place at time $t_6$ at which a sufficient amount of pressure medium will have been tapped from the wheel brake 10.

The above description of the mode of operation likewise applies to the wheel brake 23 and the second static brake circuit 22, respectively. Even if it is necessary to tap pressure medium from the wheel brakes 49 and 50 at the rear axle of the vehicle, the increase of the braking pressure following the stage of pressure reduction can take place only in a retarded manner due to the throttling action of the pressure-dependent operable valve 51. The pressure diagram represented in FIG. 2 thus is equally characteristic of all the wheel brakes 10, 23, 49 and 50.

After the termination of the control, the slip monitoring electronics will switch all the valves into their rest positions so as to reestablish the condition represented in FIG. 1.

Figure 3:
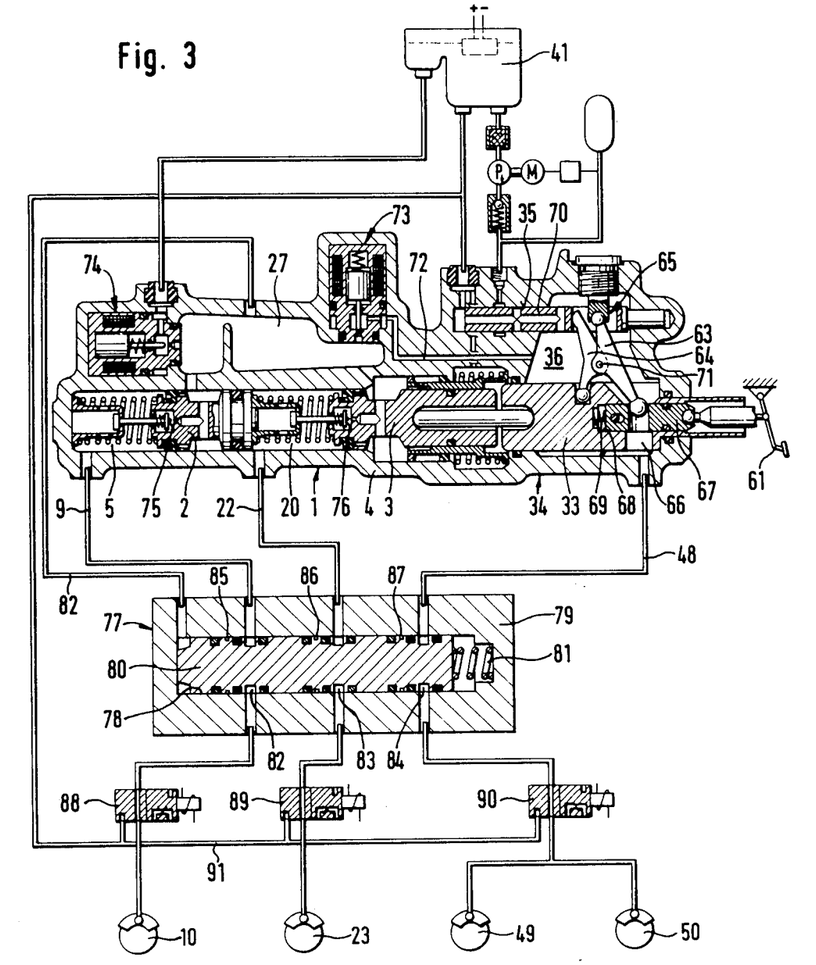
FIG. 3 is a schematic drawing of the section of a further hydraulic brake system.

The hydraulic brake system represented in FIG. 3 differs from that one represented in FIG. 1 in that the brake valve 35 is arranged in parallel with the booster piston 33 and is operable by means of two levers 63 and 64. Referring to FIG. 3, the upper end of the lever 63 is rigidly supported at the housing 4 by means of a ball-and-socket joint 65. The end of the lever 63 which is remote from the point of support 65 engages a recess 66 of a pedal-operable push rod 67 whose left end, as seen in the illustration, engages a pocket bore 68 of the booster piston 33 where it is held by a compression spring 69 at a certain distance relative to the bottom of the pocket bore. Lever 64 is pivotally linked to the lever 63 about midway along its length about a common pivot pin 71. On one end, the lever 64 rests at the valve spool 70 of the brake valve 35 and, at the other end in a cutout in the booster piston 33.

When an actuating force is exerted on the brake pedal 61, the pedal-operable push rod 67 will move to the left as shown. The push rod end remote from the brake pedal 61 will be displaced against the force of the compression spring 69 in the pocket bore 68 of the booster piston. Lever 63 will be rotated in a clockwise tilting movement around the ball-and-socket joint 65. The clockwise tilting movement will also be transmitted to the hinge or pivot pin 71 between the levers 63, 64. Since the booster piston 33, due to the seals, is counteracted by greater displacing forces than is the valve spool 70 of the brake valve 35, the lower end of the lever 64 at first will not move while the upper end of the lever 64 will carry out a counter clockwise tilting movement around the hinge 71, displacing the valve spool 70 in the direction of actuation. In this way, pressure will be supplied into the pressure chamber 36 of the hydraulic brake booster 34 which pressure will be proportional to the actuating force.

A pressure medium channel 72 from the pressure chamber 36 of the hydraulic brake booster 34 leads to an electromagnetically operable valve 73 which, when unexcited, locks the connection 72 between the pressure chamber 36 and the prechamber 27 of the master cylinder 1. The prechamber 27 of the master cylinder 1 normally communicates with the unpressurized return reservoir 41 via a further electromagnetically operable valve 74. The electromagnetically operable valves 73 and 74 are switched simultaneously as soon as slip monitoring electronics (not shown) detect a critical slip value at one or at several vehicle wheels. The electromagnetically operable valves 73 and 74 having switched over, communication will be established between the pressure chamber 36 of the hydraulic brake booster 34 and the prechamber 27, while communication between the unpressurized return reservoir 41 and the prechamber 27 of the master cylinder will be interrupted.

Further, from FIG. 3 it can be seen that the master cylinder 1a is not provided with the expansion bores as in FIG. 1 but rather with central valves 75, 76 known per se. In connection with brake slip control systems, such central valves are advantageous since gasket troubles at the master cylinder pistons 2 and 3 will result less easily in case of pulsating pressures in the working chambers 5, 20.

The brake system represented in FIG. 3 further has an integratable 6/2-way valve 77 having its essential component a piston 80 slidably supported in a bore 78 of cylinder housing 79. A compression spring 81 normally holds the piston 80 at its left end. The front face of the piston 80 which is remote from the compression spring 81 communicates with the prechamber 27 of the master cylinder 1 via a pressure line 82. The peripheral surface area of the piston 80 has one set of spaced circumferential grooves 82, 83 and 84 and a second set of spaced circumferential grooves 85, 86 and 87 of smaller cross-section. The dimensions of the 6/2-way valve 77 are selected so the valve 77 will connect the circumferential grooves 82, 83 and 84 in the respective brake circuits 9, 22 and 48 in the rest position. Thus there will be no throttling of the pressure medium flowing through the brake circuits. Connected to the 6/2-way valve 77 on the outlet side are electromagnetically operable valves 88, 89 and 90. In a first position they will allow an unhindered pressure medium flow from the brake circuits 9, 22 and 48 to the wheel brakes 10, 23, 49 and 50. In another position they will connect the wheel brakes 10, 23, 49 and 50 with a common return line 91 which on its part has communication with the unpressurized return reservoir 41.

In the operation of the brake system, of FIG. 3, upon application of a force to the brake pedal 61, a pressure will be generated in the pressure chamber 36 of the hydraulic brake booster 34. The pressure will be proportional to the actuating force and will propagate to the third brake circuit 48 and via the 6/2-way valve 77 and the opened electromagnetically operable valve 90, to the wheel brakes 49, 50 of the rear axle. Upon a displacement of the booster piston 33, the working chambers 5, 20 and the static brake circuits 9, 22, respectively, will be pressurized. Because of the connected circumferential grooves 82, 83 there will also be an unthrottled pressurization of the statically actuated wheel brakes 10, 23 of the front axle.

In case of a lock-up tendency at one or at several vehicle wheels, the electromagnetically operable valves 73, 74 will switch over so as to separate the prechamber 27 of the master cylinder 1 from the unpressurized return reservoir 41 and to have the prechamber 27 hydraulically communicate with the pressure chamber 36. The dynamic pressure supplied to the prechamber 27 will pass via the pressure line 82 to the left front face (FIG. 3) of the piston 80 of the 6/2-way valve and will displace the piston 80 against the force of the compression spring 81 to the right until finally the second set of circumferential grooves 85, 86 and 87, thus will have positioned in place of the first circumferential grooves 82, 83 and 84. After switching-over of one or of several of the electromagnetically operable valves 88, 89 and 90, if a new pressure medium supply to the wheel brakes 10, 23, 49 and 50 becomes necessary, the pressure medium flow will be throttled by the second circumferential grooves 85, 86 and 87, thus resulting in a relatively flat increase of the pressure in the wheel brakes 10, 23, 49 and 50. It should be noted that the second circumferential grooves 85, 86 and 87 may readily differ in their cross-sections, thus resulting in different throttling effects in the static brake circuits 9, 22 and in the dynamic brake circuit 48. The pressure diagram represented before in FIG. 2 also applies to the hydraulic brake system of FIG. 3.

Figure 4:
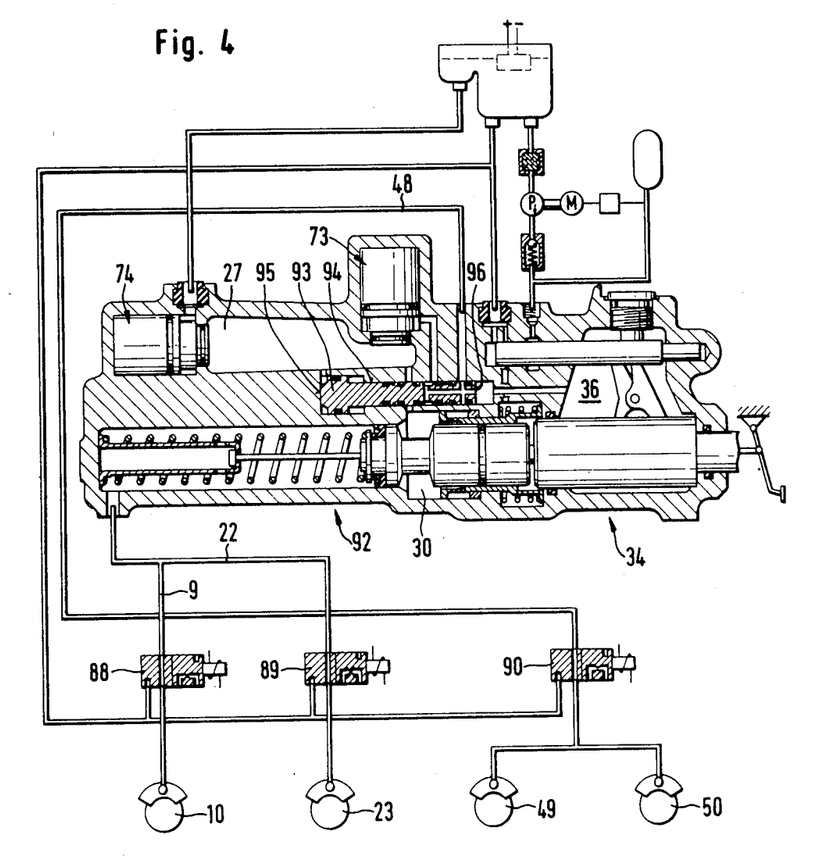
FIG. 4 is a schematic section of a hydraulic brake system with a special design of a throttle valve.

The brake system represented in FIG. 4 has a hydraulic brake booster 34 (as shown in FIG. 3) and a single-type master cylinder 92, both static brake circuits 9 and 22 being jointly connected to the master cylinder 92. Inserted into the housing of the master cylinder 92 or of the hydraulic brake booster 34, respectively, is a working piston 93 designed as stepped piston and slidably arranged in a stepped bore 94. The larger face 95 of the piston 93 hydraulically communicates with the prechamber 27 of the master cylinder 92, while the smaller face 96 of the stepped piston 93 is permanently exposed to the pressure in the pressure chamber 36 of the hydraulic brake booster. Because of the different effective surfaces of sections at faces 95 and 96 of the stepped piston 93, the stepped piston 93 will remain in a left end position (as shown) as long as the prechamber 27 of the master cylinder 92 is not pressurized. In this position, there exists an open communication between the pressure chamber 36 and the dynamic brake circuit 48 as well as between the prechamber 27 and the annular chamber 30. During brake slip control, the electromagnetically operable valves 73 and 74 change positions, and the working piston 93 will come into its right end position in which it will again connect throttles in the connection between the prechamber 27 and the annular chamber 30, and between the pressure chamber 36 and the dynamic brake circuit 48. Thus, as shown in FIG. 2, an increase of the braking pressure in the wheel brakes 10, 23, 49 and 50 will be delayed.

Figure 5:
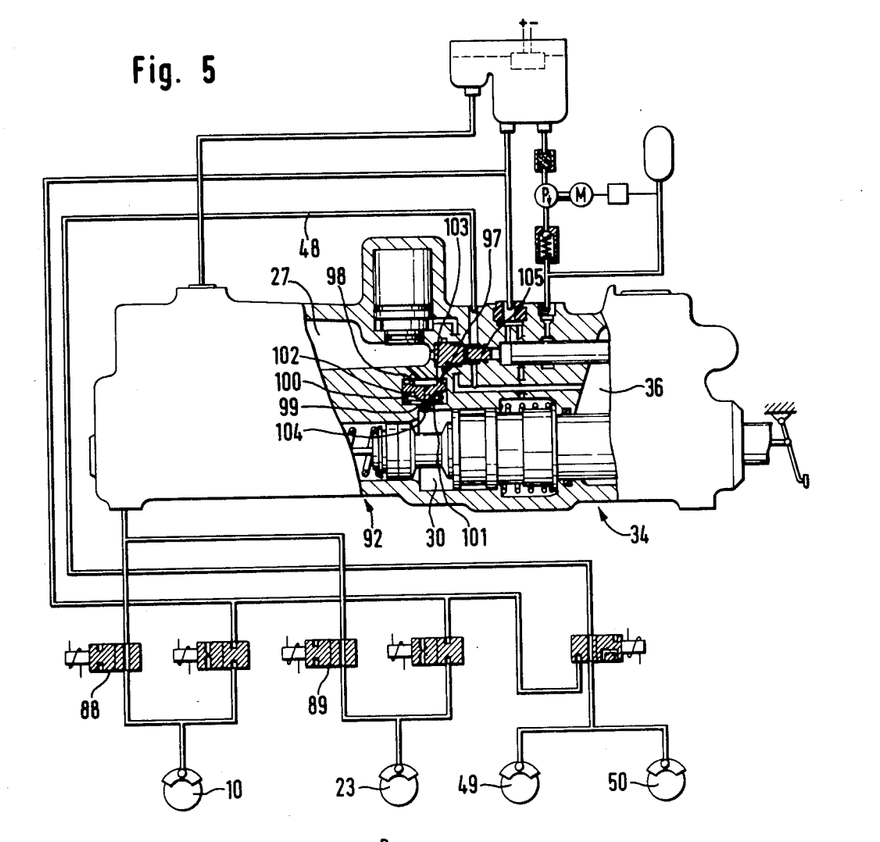
FIG. 5 is a schematic partially broken section of a hydraulic brake system with an alternatively designed throttle valve.

Finally, in FIG. 5 a dual circuit brake system is represented with a master cylinder 92. In this brake system, a throttle valve 97 is arranged in the connection between the prechamber 27 and the annular chamber 30. Throttle valve 97 is designed as double seat valve and has a prechamber-side valve seat 98 and an annular-chamber-side valve seat 99. A closure member 101 is arranged in a valve chamber 100 of the throttle valve 97. The closure member 101 is prestressed relative to the prechamber-side valve seat 98 and essentially is a rotationally symmetrical element. In the position represented in FIG. 5, member 101 rests with circumferential elevations 103 at the prechamber-side valve seat 98, thus causing a relatively large flow cross-section between the prechamber 27 and the annular chamber 30. Further, the closure member 101 has a central throttle bore of small cross-section. With closure member 101 resting at the annular-chamber-side valve seat 99, pressure medium may flow from the prechamber 27 to the annular chamber 30 exclusively via the throttle bore 104. Again, in the connection to the pressure chamber 36 of the hydraulic brake booster 34, a piston 105 is arranged which may switch into a throttling position. In the illustrated end position it establishes an unthrottled communication between the pressure chamber 36 of the hydraulic brake booster and the dynamic brake circuit 48.

If in the brake system of FIG. 5, the prechamber 27 is pressurized during brake slip control, the piston 105 will come into its right end position in which there will be a throttling of the pressure medium supply from the pressure chamber 36 of the hydraulic brake booster to the dynamic brake circuit 48.

Upon pressurization of the prechamber 27 further, the closure member 101 will come into its throttling position after a time delay. This delay will be effected in that at first pressure medium will flow from the prechamber 27 into the annular chamber 30, passing the circumferential elevations 103 of the closure member 101. In doing so, a pressure difference will develop at the closure member 101 which finally will be great enough to overcoxe the force of the compression spring 102 and cause the closure member 101 to abut the annular-chamber-side valve seat 99.

Figure 6:
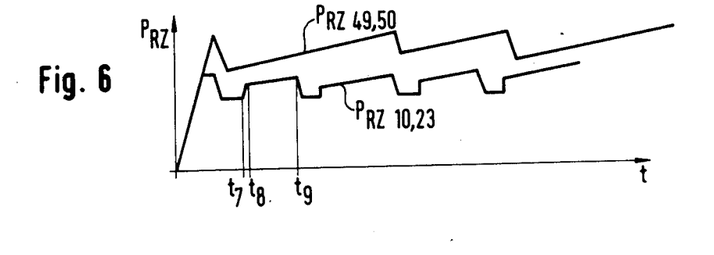
FIG. 6 is a graph showing pressure course of the hydraulic brake system according to FIG. 5.

The pressure course achievable by means of the throttle valve 97 in the wheel brakes 10 and 23 is graphically represented in the lower curve of the diagram of FIG. 6. In FIG. 6 it is assumed that after a terminated removal of pressure medium from the wheel brakes 10 and 23 followed by a stage of keeping the pressure up, the rotational behavior of the vehicle wheels associated with the wheel brakes 10 and 23 will have recovered enough to allow the braking pressure to build up anew. According to FIG. 6 this will occur at time $t_7$. At time $t_7$, the electromagnetically operable valves 88 and 89 will again switch into the open position. With the prechamber 27 of the master cylinder simultaneously being pressurized, a relatively large amount of pressure medium will start flowing via the throttle valve 97 to the annular chamber 30. At time $t_8$ the closure member 101 will rest at the annular-chamber-side valve seat 99, thus a further pressure increase in the wheel brakes 10 and 23 exclusively is possible in a strongly throttled manner. Consequently, the course of the pressure gradient in the wheel brakes 10 and 23 will be relatively flat until time $t_9$.

I claim:

1. In a hydraulic brake system with slip control for motor vehicles, including a master cylinder with a hydraulic brake booster arranged in front of the master cylinder, with at least one static brake circuit connected to the master cylinder and with a dynamic brake circuit connected to a pressure chamber of the hydraulic brake booster, with valves connected in the brake circuits for the control of wheel cylinder pressures during slip control, and with a gasket at the master cylinder piston, said gasket acting as check valve for supplying pressure medium from the dynamic brake circuit into the static brake circuit by means of pressurization of the face of the master cylinder piston adjacent the brake pedal, said master cylinder piston face alternatively connected to the dynamic brake circuit or to an unpressurized return reservoir by means of a electromagnetic switch-over valve, the invention wherein upon pressurization of the face of the master cylinder piston, a throttle is connected from the booster pressure chamber to the dynamic brake circuit and to said switch-over valve so as to divide and throttle the pressure medium supply from the booster pressure chamber to the dynamic circuit and to the static brake circuit wherein the throttle is a component of a pressure-dependent 2/2-way valve which will switch from free passage into a throttling position upon pressurization of the face of the master cylinder piston, and the 2/2-way valve is electromagnetically operable and recieves the same switch signals as the electromagnetic switch-over valve.

2. A hydraulic brake system as claimed in claim 1, wherein said master cylinder piston has a first and a second section, two annular chambers one at each said section, two separate prechambers of said master cylinder alternatively connectible to the dynamic brake circuit or to said unpressurized return reservoir by means of said electromagnetic switch-over valve and two additional throttles in the form of predetermined sized orifices one each arranged in a connection between each said prechamber and each said annular chamber.

* * * * *